(12) United States Patent
Brown et al.

(10) Patent No.: US 7,628,319 B2
(45) Date of Patent: Dec. 8, 2009

(54) METHOD AND SYSTEM FOR ENABLING ITEM-LEVEL APPROVAL OF PAYMENT CARD

(75) Inventors: Peggy Brown, Chesterfield, MO (US); Janet Guthrie, San Francisco, CA (US); Edward McLaughlin, Newtown, PA (US); Samantha Ross, New York, NY (US); Matthew Lanford, New York, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 11/772,891

(22) Filed: Jul. 3, 2007

(65) Prior Publication Data

US 2008/0011820 A1 Jan. 17, 2008

Related U.S. Application Data

(60) Provisional application No. 60/831,280, filed on Jul. 17, 2006.

(51) Int. Cl.
*G06F 17/00* (2006.01)
(52) U.S. Cl. .................. 235/375; 235/379; 235/380; 705/35
(58) Field of Classification Search .............. 235/379, 235/380, 375, 79; 705/35
See application file for complete search history.

(56) References Cited

U.S. PATENT DOCUMENTS

| | | | |
|---|---|---|---|
| 5,649,118 A | 7/1997 | Carlisle et al. | |
| 6,012,035 A | 1/2000 | Freeman, Jr. et al. | |
| 6,208,973 B1 | 3/2001 | Boyer et al. | |
| 7,072,842 B2 | 7/2006 | Provost et al. | |
| 2002/0147678 A1 | 10/2002 | Drunsic et al. | |
| 2002/0198831 A1 | 12/2002 | Patricelli et al. | |
| 2004/0073457 A1 | 4/2004 | Kalies | |
| 2004/0138999 A1 | 7/2004 | Friedman et al. | |
| 2005/0015280 A1 | 1/2005 | Gabel et al. | |
| 2005/0080692 A1 | 4/2005 | Padam et al. | |
| 2005/0121511 A1 | 6/2005 | Robbins, Jr. et al. | |
| 2005/0165682 A1 | 7/2005 | Duke | |
| 2005/0178828 A1 | 8/2005 | Agostino et al. | |
| 2005/0192895 A1 | 9/2005 | Rogers et al. | |
| 2005/0261968 A1 | 11/2005 | Randall et al. | |
| 2005/0267784 A1 | 12/2005 | Slen et al. | |
| 2005/0288964 A1 | 12/2005 | Lutzen et al. | |
| 2006/0113376 A1* | 6/2006 | Reed et al. ............. | 235/379 |
| 2006/0143052 A1 | 6/2006 | Fotsch et al. | |
| 2006/0149603 A1 | 7/2006 | Patterson et al. | |
| 2006/0149670 A1* | 7/2006 | Nguyen et al. ........... | 705/39 |
| 2006/0151598 A1 | 7/2006 | Chen et al. | |
| 2006/0167720 A1 | 7/2006 | Harrison et al. | |
| 2006/0167724 A1 | 7/2006 | Peterson, Jr. et al. | |

\* cited by examiner

*Primary Examiner*—Seung H Lee
(74) *Attorney, Agent, or Firm*—Ryan, Mason & Lewis, LLP; Leonardo Renna; Paul J. Otterstedt (57) ABSTRACT

A method includes the steps of facilitating obtaining indicia identifying individual items to be purchased at a point of interaction, in conjunction with an inbound authorization request; facilitating translation of the indicia into a form understandable by a third party transaction approver, to obtain translated indicia; and facilitating transfer of the translated indicia to the third patty transaction approver for item-by-item validation on the individual items. The transfer of the translated indicia is in conjunction with an outbound authorization request. A system implementing the method can make use of an inventive transfer engine.

24 Claims, 4 Drawing Sheets

METHOD AND SYSTEM FOR ENABLING ITEM-LEVEL APPROVAL OF PAYMENT CARD

CROSS-REFERENCE TO RELATED APPLICATIONS

This patent application claims the benefit of U.S. Provisional Patent Application Ser. No. 60/831,280 filed Jul. 17, 2006 and entitled "Method and System for Enabling Item-Level Approval of Payment Card" of inventors Peggy Brown et al. The disclosure of the aforementioned Provisional Patent Application Ser. No. 60/831,280 is expressly incorporated herein by reference in its entirety.

FIELD OF THE INVENTION

The present invention relates generally to electronic commerce, and, more particularly, to electronic payment systems.

BACKGROUND OF THE INVENTION

It is known to use payment cards, such as credit cards, debit cards, cards which hold a balance, and the like, to make payments. Typically, in approving transactions with such cards, a total requested amount is approved or disapproved, depending on whether the card holder has a sufficient balance or credit line, as the case may be. Such "all or nothing" approval may not meet the needs for new applications of electronic payment technology.

Accordingly, a need exists for a more flexible approach.

SUMMARY OF THE INVENTION

Principles of the present invention provide techniques for enabling item-level approval of a payment card (or other payment device). An exemplary embodiment of a method (which can be computer-implemented), according to one aspect of the invention, for such electronic payment validation, includes the steps of facilitating obtaining indicia identifying individual items to be purchased at a point of interaction, in conjunction with an inbound authorization request; facilitating translation of the indicia into a form understandable by a third party transaction approver, to obtain translated indicia; and facilitating transfer of the translated indicia to the third party transaction approver for item-by-item validation on the individual items. The transfer of the translated indicia is in conjunction with an outbound authorization request.

An exemplary embodiment of an apparatus for electronic payment validation, according to another aspect of the invention, includes a memory and at least one processor coupled to the memory. The processor can be operative to perform one or more method steps, such as those just described.

In another aspect, a method (which can be computer-implemented) for building a database useful in facilitating electronic payment validation, includes the step of facilitating obtaining, via pre-registration of a plurality of providers, provider indicia identifying individual items to be purchased, together with identities and costs of the items. At least some of the provider indicia differ, among given ones of the providers, for an identical one of the items to be purchased. The method further includes the additional step of facilitating generating a translation database having a single translated indicia associated with each given one of the items, regardless of whether given ones of the providers have different provider indicia associated with the given one of the items The method yet further includes the additional step of facilitating storage of the translation database in a form to facilitate ready translation of a given provider indicia into a corresponding translated indicia, based on the given provider indicia and an identity of a given one of the providers associated with the given provider indicia.

An exemplary embodiment of an apparatus for building a database useful in facilitating electronic payment validation, according to another aspect of the invention, includes a memory and at least one processor coupled to the memory. The processor can be operative to perform one or more method steps, such as those just described.

Further, one or more method steps of the present invention can be implemented in the form of an article of manufacture comprising a machine readable medium that contains one or more programs which when executed implement such step(s).

Techniques of the present invention can provide substantial beneficial technical effects. These can include, for example, reducing or eliminating the need for a third party approver to maintain multiple data tables, thus resulting in faster processing time.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
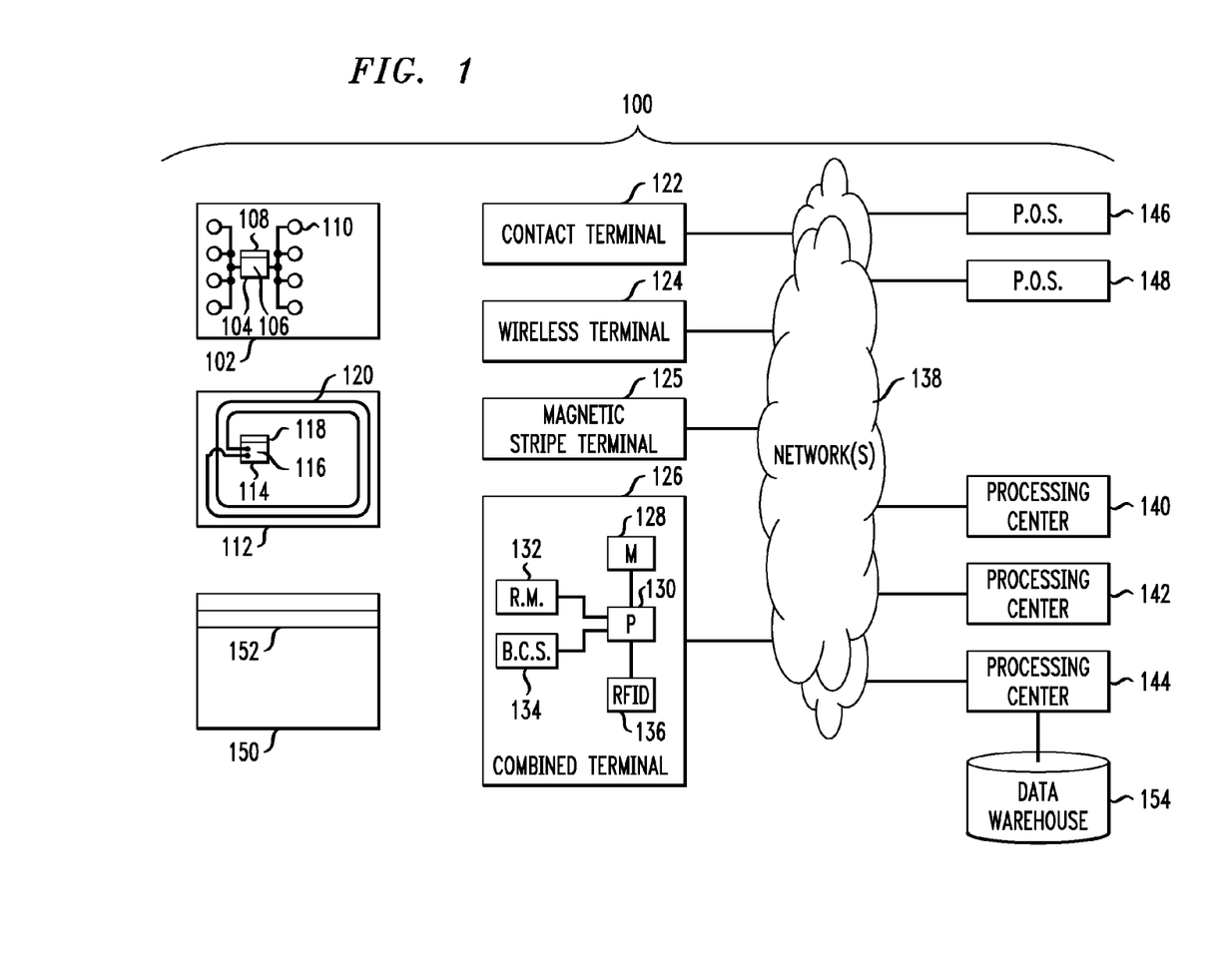
FIG. 1 shows a general example of a payment system that can implement techniques of the invention.

Attention should now be given to FIG. 1, which depicts an exemplary embodiment of a system 100, according to an aspect of the present invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes In addition to or instead of card 102, system 100 can also be designed to work with a contactless device such as card 112 Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the present invention. Other types of devices could include a conventional card 150 having a magnetic stripe 152, an appropriately configured cellular telephone handset, and the like. Indeed, techniques of the present invention can be adapted to a variety of different types of cards, terminals, and other devices.

The ICs 104, 114 can contain processing units 106, 116 and memory units 108, 118 Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by StepNexus Inc Alternatively, JAVA CARD™-based operating systems, based on JAVA CARD™ technology (licensed by Sun Microsystems, Inc, 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible standard to which such applications may conform is the EMV payment standard set forth by EMVCo, LLC (http://www.emvco.com). It will be appreciated that applications can be configured in a variety of different ways.

As noted, cards 102, 112 are examples of a variety of payment devices that can be employed with techniques of the present invention. The primary function of the payment devices may not be payment, for example, they may be cellular phone handsets that implement techniques of the present invention. Such devices could include cards having a conventional form factor, smaller or larger cards, cards of different shape, key fobs, personal digital assistants (PDAs), appropriately configured cell phone handsets, or indeed any device with the capabilities to implement techniques of the present invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more method steps. The applications can be, for example, application identifiers (AIDS) linked to software code in the form of firmware plus data in a card memory such as an electrically erasable programmable read-only memory (EEPROM). Again, note that "smart" cards are not necessarily required and a conventional magnetic stripe card can be employed A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network. More than one network could be employed to connect different elements of the system. Processing centers 140, 142, 144 can include, for example, a host computer of an issuer of a payment device. Further details regarding one specific form of network will be provided below.

Many different retail or other establishments, represented by points-of-sale 146, 148, can be connected to network 138. In one or more embodiments of the invention, it is believed preferable that various establishments interface with a telecommunications network, such as a virtual private network (VPN), via one or more machines which are then connected to the network. This will be discussed further below. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128, which then contactlessly transmits the electronic data to the proximity IC chip in the card 112 or other wireless device.

One or more of the processing centers 140, 142, 144 can include a database such as a data warehouse 154.

Figure 2:
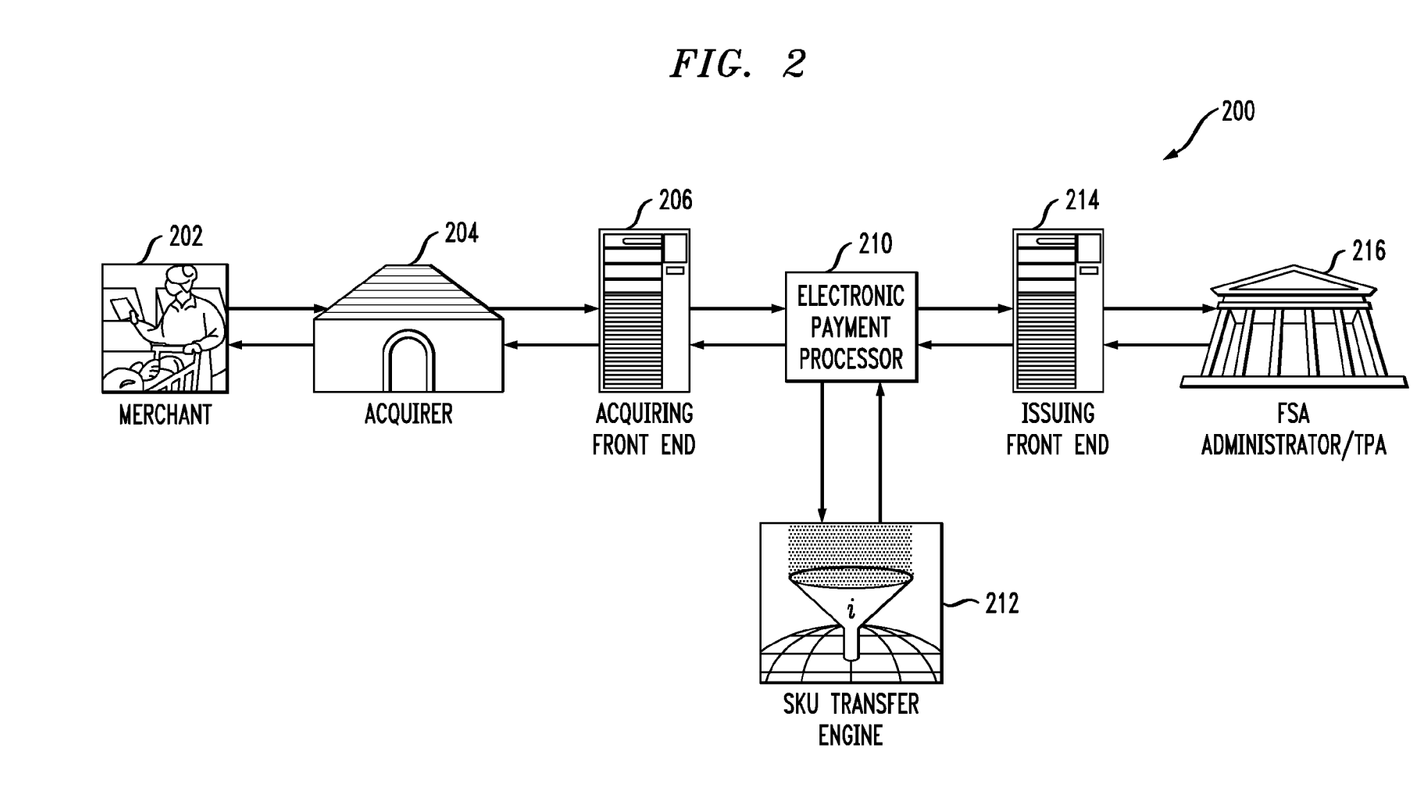
FIG. 2 shows data flow in an exemplary specific embodiment of the invention.

Attention should now be given to FIG. 2, which is a block diagram 200 of one possible specific exemplary embodiment of the invention, also depicting (via the arrows) data flow according to the exemplary embodiment. As shown at 202, the holder of a card or other payment device interacts with a terminal at a point of interaction, such as a facility of a merchant or other card acceptor, corresponding, e.g., to terminals and points of sale as described with respect to FIG. 1. The card acceptor sends transaction information to an acquirer 204, for example, via a network such as described in FIG. 1. The merchant can provide indicia such as stock keeping unit (SKU) numbers, universal product codes (UPCs), and/or national drug codes (NDCs). "SKU" is a common term for a unique numeric identifier, used most commonly in online business to refer to a specific product in inventory or in a catalog. The indicia can be provided in an authorization request. A front end processor 206 can be provided between acquirer 206 and electronic payment processor 210 (e.g., a virtual private network (VPN) of a credit card company or third party credit card processor). Front end processor 206 can be located in a variety of places, e.g., at the acquirer's facility. One example of a suitable front end processor 206 is a MASTERCARD INTERFACE PROCESSOR™ or MIP™ processor (trademarks of MasterCard International, Inc of Purchase, N.Y.). The acquirer 204 should be a split tender acquirer, as will be discussed more fully hereinafter The skilled artisan will of course appreciate that in this context, "processor" 210 means, e.g., an entity having a VPN or other network, and the like, while "processor" 206, 214 means a more specific piece of hardware.

The acquirer 204 can forward the indicia, for example, via processor 206 and processor 210, to a transfer engine 212. The transfer engine is depicted in FIG. 2 as an "SKU Transfer Engine" but it should be understood that it can process a wide variety of indicia as discussed herein. Engine 212 receives the authorization request and translates the indicia into a form understandable by an administrator such as Third Party Administrator (TPA) 216. The translated indicia can be populated into the authorization request, which is then forwarded by engine 212 to an administrator such TPA 216. This forwarding can be via processor 210. Administrator 216 can be, for example, an issuer of a card used by the consumer, or a party acting on behalf of such issuer In one or more embodiments, the card can be associated with a healthcare account such as a flexible spending account (FSA) or health savings account (HSA). It is to be understood that the invention in is no way limited to healthcare applications, and can be used whenever item-by-item approval of purchases is desirable.

Another front-end processor 214, such as a MIP™, can be located, e.g., at the facility of an issuer or other administrator 216 to provide access to the aforementioned VPN of processor 210. Of course, there may be a plurality of similarly-equipped issuer, and other, facilities. Furthermore, it is to be emphasized that the configuration shown in FIG. 2 is purely exemplary in nature Other approaches can be employed, e.g., instead of an architecture using processors 206, 214 and a VPN of a processor 210, an Internet portal configuration could also be used. The skilled artisan will also appreciate that other variations are possible Third party administrator 216 can match the translated indicia against a database containing, for example, lists of eligible items under a given health (or other) plan, can approve individual values, and can sum the approved amount. The approved amount can be provided in a response message to be returned to the merchant 202 through the reverse of the path just described, as shown by the return arrows. Note that the third patty approver may maintain a database listing eligible items, while the engine 212 may maintain a database for translation.

Front end processors, such as processor 206, 214, and VPNs, such as the VPN of processor 210, are well-known to skilled artisans. In one specific example, the processors 206, 214 are (as noted) MIP™ processors, and the VPN of processor 210 is a telecommunications network providing MASTERCARD BANKNET® telecommunications network services (registered trademark of MasterCard International, Inc. of Purchase, N.Y.).

Figure 3:
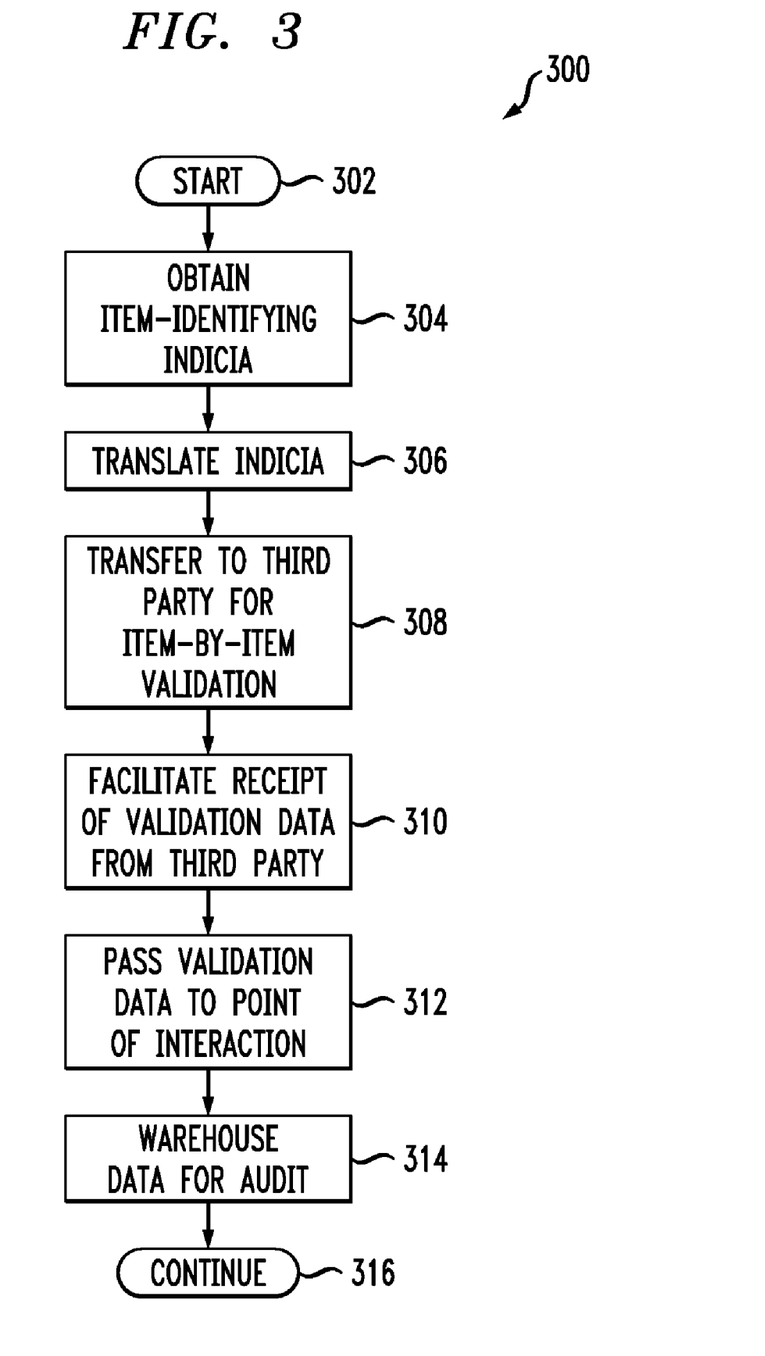
FIG. 3 is a flow chart of an exemplary method according to an aspect of the invention.

FIG. 3 presents a flow chart 300 of exemplary method steps for electronic payment validation. After beginning at block 302, at step 304, a step of facilitating obtaining indicia identifying individual items to be purchased at a point of interaction, in conjunction with an inbound authorization request, can be conducted The indicia can include, e.g., SKUs, UPCs, NDCs, and the like. The individual items to be purchased can include products and/or services. The point of interaction can be any place where the transaction takes place, e.g., a doctor's office, a merchant such as a drug store, etc. The flow in FIG. 3 is presented from the perspective of a transfer engine such as element 212, and the inbound authorization request is thus inbound from acquirer 204. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

Step 306 includes facilitating translation of the indicia into a form understandable by a third party transaction approver, such as issuer 216, to obtain translated indicia Step 308 includes facilitating transfer of the translated indicia to the third party transaction approver for item-by-item validation on the individual items. The transfer of the translated indicia is in conjunction with an outbound authorization request (e g., outbound from engine 212 to third party 216).

Further possible steps include steps 310 and 312. Step 310 includes facilitating receipt of validation data associated with the item-by-item validation on the individual items from the third party transaction approver. The data could include, for example, a total sum approved and/or item-by-item approvals. The item-by-item validation is based at least on matching of the translated indicia against a database. Note, even when only a total approved sum is included in the data, items are still validated by issuer 216 on an item-by-item basis. Step 312 includes facilitating passage of the validation data in a response message to be touted to the point of interaction.

As noted, the validation data can include a total approved monetary amount reflecting a total price of those of the items that are valid. The total approved monetary amount is no greater than the total purchase price of the individual items to be purchased (inclusive of any appropriate tax, as will be discussed further hereinafter). In another aspect, the validation data comprises flags for each of the individual items, and the flags indicate whether a given one of the items is valid. If desired, both a total approved amount and flags can be included.

In step 304, the indicia identifying the individual items may be obtained, in conjunction with the inbound authorization request, from a split-tender acquirer (a split-tender acquirer is one having a capability to pass back to a merchant from whom the items are to be purchased a total approved monetary amount that is less than the amount in the inbound authorization request).

Optional step 314 includes warehousing (e.g., in a data warehouse such as 154) at least the translated indicia and the validation data for audit.

In one or more embodiments, the third party transaction approver is associated with an issuer of a healthcare card, and the database contains at least indications of whether a given translated indicia represents an item reimbursable by the issuer of the healthcare card. By way of example, a card holder might purchase gauze bandages, aspirin and cigarettes; the first two items would be reimbursable but not the cigarettes. The user can be prompted to pay for disapproved items via cash, check, another payment card, etc. Where the items include drugs, the indicia identifying the items can further include time-period-supply-data (e g, a thirty-, sixty-, or ninety-day supply of a given medication).

Processing continues at block 316.

Figure 4:
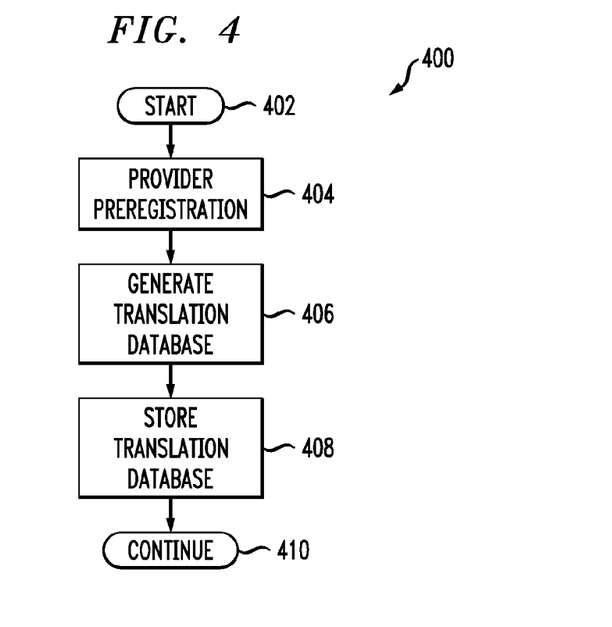
FIG. 4 is a flow chart of another exemplary method according to an aspect of the invention.

FIG. 4 shows a flow chart 400 of an exemplary method, which can be computer-implemented, for building a database useful in facilitating electronic payment validation. At this point it should be noted that while the methods described with regard to FIGS. 3 and 4 can be computer-implemented, in one or more exemplary embodiments, they may also include one or more manual steps, or a combination of manual and computer-aided steps. After beginning at block 402, step 404 includes facilitating obtaining, via pre-registration of a plurality of providers (e.g., merchants, pharmacies, doctors, etc.), provider indicia (e.g., SKU, UPC, drug code, and the like) identifying individual items (products and/or services) to be purchased, together with identities and costs of the items. At least some of the provider indicia differ, among given ones of the providers, for an identical one of the items to be purchased. That is, by way of example, Smith's Pharmacy and Baker's Pharmacy may use different SKUs for an identical package of adhesive bandages.

Step 406 includes facilitating generating a translation database having a single translated indicia associated with each given one of the items, regardless of whether given ones of the providers have different provider indicia associated with the given one of the items. That is, the package of adhesive bandages is identified by a single unique (translated) identifier, regardless of the fact that Smith and Baker each use a different identifier for it.

Step 408 includes facilitating storage of the translation database in a form to facilitate ready translation of a given provider indicia into a corresponding translated indicia, based on the given provider indicia and an identity a given one of the providers associated with the given provider indicia. That is, given the identity of the pharmacy or other provider and its SKU for the product, the universal identifier can be looked up so that the third party can render an approve/disapprove decision.

Processing continues at step 410.

For purposes of illustrative convenience, not every block in FIGS. 3 and 4 includes the word "facilitate," but it will be understood that the method depicted broadly include facilitation of the indicated actions as well as their actual performance.

By way of summary and provision of additional detail, the inbound authorization request discussed above can contain information that includes the cost per item and the identity of the item. To sum the properly approved amount, such information can also include sales tax or value added tax (VAT) information. This cost and tax information need not be in the database maintained by the third party approver. Cost for each item need not be included in the translation database, but may be passed to the engine 212 from the merchant in the authorization request along with the indicia. As noted above, quantity can come into play in the case of prescription and/or over-the-counter (OTC) drugs (i.e. 30 day supply vs. 90 day supply) and could be passed in the authorization request to the third party approver. The third party would then make decisions at the per-item level based on the data provided in the authorization request. While cost of the item need not be part of the decision, it could be taken into account.

It will be appreciated that one or more exemplary embodiments of the present invention can provide one or more advantages; for example, reducing or eliminating the need for a third party approver to maintain multiple data tables, thus resulting in faster processing time. Such reduced processing time may be enabled, in one or more embodiments, via the inventive translation database.

The invention can employ hardware and/or software aspects. Software includes but is not limited to firmware, resident software, microcode, etc. Software might be employed, for example, in connection with one or more of a terminal 122, 124, 125, 126, a front end processor 206, 214, a transfer engine 212, or a processing center 140, 142, 144 (optionally with data warehouse 154) of a merchant, issuer, acquirer, processor, or credit card company. It is presently believed that engine 212 can be advantageously implemented, e.g., in software running on a general purpose computer. Software running on a computer can also be used for building the database as shown in FIG. 4. Firmware might be employed, for example, in connection with payment devices such as cards 102, 112.

Figure 5:
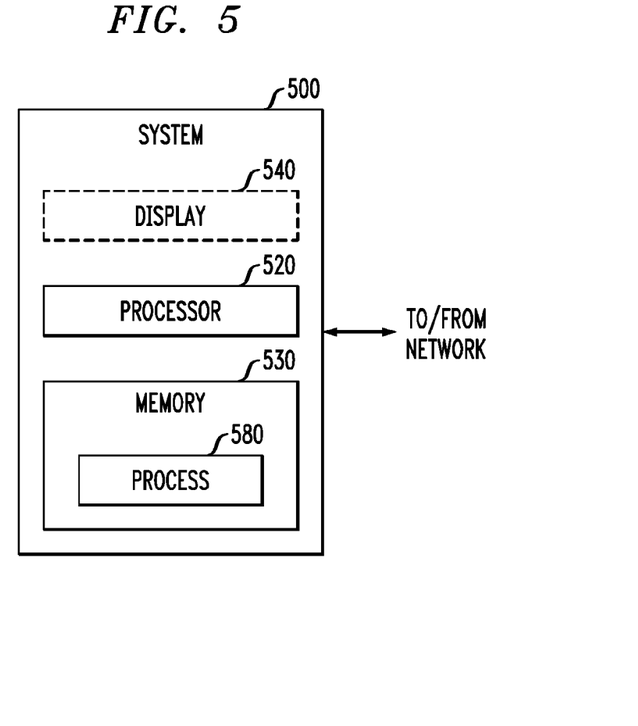
FIG. 5 is a block diagram of an exemplary computer system useful in one or more embodiments of the present invention.

FIG. 5 is a block diagram of a system 500 that can implement part or all of one or more aspects or processes of the present invention. As shown in FIG. 5, memory 530 configures the processor 520 (which could correspond, e.g., to processor portions 106, 116, 130, processors of elements 206-214, or processors of remote hosts in centers 140, 142, 144) to implement one or more aspects of the methods (e.g., as per FIGS. 3 and/or 4), steps, and functions disclosed herein (collectively, shown as process 580 in FIG. 5). Different method steps can be performed by different processors. The memory 530 could be distributed or local and the processor 520 could be distributed or singular The memory 530 could be implemented as an electrical, magnetic or optical memory, or any combination of these or other types of storage devices (including memory portions as described above with respect to cards 102, 112). It should be noted that it distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware. Display 540 is representative of a variety of possible input/output devices.

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, 206-214 or by any combination of the foregoing The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be lead from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 125, 126, processing centers 140, 142, 144 with data warehouse 154, processors 206-214, or payment devices such as cards 102, 112 can make use of computer technology with appropriate instructions to implement method steps described herein. By way of further example, a terminal apparatus 122, 124, 125, 126 could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe). By way of yet a further example, an apparatus for electronic payment validation (such as engine 212), and/or an apparatus for building a database useful in facilitating electronic payment validation, could include a memory and at least one processor coupled to the memory. The processor can be operative to perform one or more method steps described herein (e.g., in FIGS. 3 and/or 4), or otherwise facilitate their performance.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for electronic payment validation, comprising the steps of:

providing an apparatus, wherein said apparatus comprises at least one hardware processor, a transfer engine software module embodied in at least one tangible computer readable recordable storage medium, and a translation database embodied in said at least one tangible computer readable recordable storage medium, said at least one hardware processor being configured to execute said transfer engine software module and access said translation database;

facilitating obtaining, over a payment network, indicia identifying individual items to be purchased at a point of interaction, in conjunction with an inbound authorization request;

facilitating translation of said indicia into a form understandable by a third party transaction approver, to obtain translated indicia, said translation being carried out by said at least one hardware processor executing said transfer engine software module and accessing said translation database; and facilitating transfer, over said payment network, of said translated indicia to said third party transaction approver for item-by-item validation on said individual items, said transfer of said translated indicia being in conjunction with an outbound authorization request.

2. The method of claim 1, further comprising the additional steps of:

facilitating receipt of validation data associated with said item-by-item validation on said individual items from said third party transaction approver, said item-by-item validation being based at least on matching of said translated indicia against a validation database; and facilitating passage of said validation data in a response message to be routed to said point of interaction.

3. The method of claim 2, wherein said validation data comprises a total approved monetary amount reflecting a total price of those of said items that are valid, said total approved monetary amount being no greater than a total purchase price of said individual items to be purchased.

4. The method of claim 3, wherein said validation data further comprises flags for each of said individual items, said flags indicating whether a given one of said items is valid.

5. The method of claim 2, wherein said validation data comprises flags for each of said individual items, said flags indicating whether a given one of said items is valid.

6. The method of claim 2, further comprising the additional step of warehousing at least said translated indicia and said validation data for audit.

7. The method of claim 2, wherein:
said third party transaction approver is associated with an issuer of a healthcare card; and
said validation database contains at least indications of whether a given translated indicia represents an item reimbursable by said issuer of said healthcare card.

8. The method of claim 7, wherein said items comprise at least drugs and said indicia identifying said items further comprises time-period-supply-data.

9. The method of claim 1, wherein said indicia identifying said individual items comprise at least stock keeping unit (SKU) numbers.

10. The method of claim 1, wherein said indicia identifying said individual items comprise at least stock universal product codes (UPCs).

11. The method of claim 1, wherein said indicia identifying said individual items comprise at least stock national drug codes (NDCs).

12. The method of claim 1, wherein said indicia identifying said individual items are obtained, in conjunction with said inbound authorization request, from a split-tender acquirer, said split-tender acquirer having a capability to pass back to a merchant from whom said items are to be purchased a total approved monetary amount less than an amount in said inbound authorization request.

13. A method comprising the steps of:
facilitating obtaining, via pre-registration of a plurality of providers, provider indicia identifying individual items to be purchased, together with identities and costs of said items, at least some of said provider indicia differing, among given ones of said providers, for an identical one of said items to be purchased;
facilitating generating a translation database embodied in at least one tangible computer readable recordable storage medium, said translation database having a single translated indicia associated with each given one of said items, regardless of whether given ones of said providers have different provider indicia associated with said given one of said items; and
facilitating storage of said translation database in a form to facilitate ready translation of a given provider indicia into a corresponding translated indicia, based on said given provider indicia and an identity of a given one of said providers associated with said given provider indicia, said translation database being stored in said at least one tangible computer readable recordable storage medium at an intermediate point in a payment network wherein said translation database is accessible to at least one hardware processor executing a transfer engine software module embodied in said at least one tangible computer readable recordable storage medium.

14. The method of claim 13, wherein said indicia identifying said individual items comprise at least stock keeping unit (SKU) numbers.

15. The method of claim 13, wherein said indicia identifying said individual items comprise at least stock universal product codes (UPCs).

16. The method of claim 13, wherein said indicia identifying said individual items comprise at least stock national drug codes (NDCs).

17. A computer program product comprising at least one tangible computer readable recordable storage medium including computer readable program code for electronic payment validation, said computer program product including:
computer readable program code for facilitating obtaining, over a payment network, indicia identifying individual items to be purchased at a point of interaction, in conjunction with an inbound authorization request;
computer readable program code, comprising a transfer engine software module executable on at least one hardware processor, for facilitating translation of said indicia into a form understandable by a third party transaction approver, to obtain translated indicia, said translation being carried out by said at least one hardware processor executing said transfer engine software module and accessing a translation database embodied in said at least one tangible computer readable recordable storage medium; and
computer readable program code for facilitating transfer, over said payment network, of said translated indicia to said third party transaction approver for item-by-item validation on said individual items, said transfer of said translated indicia being in conjunction with an outbound authorization request.

18. The computer program product of claim 17, further comprising:
computer readable program code for facilitating receipt of validation data associated with said item-by-item validation on said individual items from said third party transaction approver, said item-by-item validation being based at least on matching of said translated indicia against a validation database; and
computer readable program code for facilitating passage of said validation data in a response message to be routed to said point of interaction.

19. A computer program product comprising at least one tangible computer readable recordable storage medium including computer readable program code, said computer program product including:
computer readable program code for facilitating obtaining, via pre-registration of a plurality of providers, provider indicia identifying individual items to be purchased, together with identities and costs of said items, at least some of said provider indicia differing, among given ones of said providers, for an identical one of said items to be purchased;
computer readable program code for facilitating generating a translation database embodied in said at least one tangible computer readable recordable storage medium, said translation database having a single translated indicia associated with each given one of said items, regardless of whether given ones of said providers have different provider indicia associated with said given one of said items; and
computer readable program code for facilitating storage of said translation database in a form to facilitate ready translation of a given provider indicia into a corresponding translated indicia, based on said given provider indicia and an identity of a given one of said providers associated with said given provider indicia, said translation database being stored in said at least one tangible computer readable recordable storage medium at an intermediate point in a payment network wherein said translation database is accessible to at least one hardware processor executing a transfer engine software module embodied in said at least one tangible computer readable recordable storage medium.

20. An apparatus for electronic payment validation, said apparatus comprising:
a memory; and
at least one processor coupled to said memory, said processor being operative to:
facilitate obtaining indicia identifying individual items to be purchased at a point of interaction, in conjunction with an inbound authorization request;
facilitate translation of said indicia into a form understandable by a third party transaction approver, to obtain translated indicia; and
facilitate transfer of said translated indicia to said third party transaction approver for item-by-item validation on said individual items, said transfer of said translated indicia being in conjunction with an outbound authorization request.

21. The apparatus of claim 20, wherein said memory and said at least one processor are located at an intermediate point in a payment network, further comprising:
an interface allowing said at least one processor to communicate with said payment network; and
at least one tangible computer readable recordable storage medium embodying:
a translation database accessible to said at least one processor, and
a transfer engine software module executable by said at least one processor to facilitate said translation, and
wherein said indicia identifying individual items are obtained over said payment network and said translated indicia are transferred over said payment network.

22. The apparatus of claim 21, wherein said processor is further operative to:
facilitate receipt of validation data associated with said item-by-item validation on said individual items from said third party transaction approver, said item-by-item validation being based at least on matching of said translated indicia against a validation database; and
facilitate passage of said validation data in a response message to be routed to said point of interaction.

23. An apparatus comprising:
a memory; and
at least one processor coupled to said memory, said processor being operative to:
facilitate obtaining, via pre-registration of a plurality of providers, provider indicia identifying individual items to be purchased, together with identities and costs of said items, at least some of said provider indicia differing, among given ones of said providers, for an identical one of said items to be purchased;
facilitate generating a translation database having a single translated indicia associated with each given one of said items, regardless of whether given ones of said providers have different provider indicia associated with said given one of said items; and
facilitate storage of said translation database in a form to facilitate ready translation of a given provider indicia into a corresponding translated indicia, based on said given provider indicia and an identity of a given one of said providers associated with said given provider indicia.

24. The apparatus of claim 23, wherein said memory and said at least one processor are located at an intermediate point in a payment network, further comprising at least one tangible computer readable recordable storage medium, said translation database being stored in said at least one tangible computer readable recordable storage medium at said intermediate point in said payment network, said translation database being accessible to said at least one processor, said at least one processor executing a transfer engine software module embodied in said at least one tangible computer readable recordable storage medium.

* * * * *